July 6, 1937.  L. E. BOOTH  2,085,947

AERATING MACHINE

Filed March 30, 1936

COMPRESSED AIR OR GAS.

INVENTOR
L. E. BOOTH,
BY
ATTORNEY

Patented July 6, 1937

2,085,947

UNITED STATES PATENT OFFICE 2,085,947

AERATING MACHINE

Lionel E. Booth, Salt Lake City, Utah, assignor to The Galigher Company, Salt Lake City, Utah, a corporation of Utah Application March 30, 1936, Serial No. 71,566

7 Claims. (Cl. 261—93)

This invention relates to an aerating machine, and more particularly an aerating machine having an impeller rotatable about a vertical axis and submerged in a liquid or semi-liquid, such as a metallurgical pulp, and represents an improvement upon the aerating machine disclosed in my application for U. S. Patent filed March 26, 1932, Serial No. 601,321, issued as U. S. Patent 2,055,065, dated Sept. 22, 1936.

The principal object of the invention is to provide an efficient aerating machine particularly useful in the separation of mineral values from the gangue in metalliferous pulps, by flotation.

Another object is to provide an impeller submerged in the pulp and having its bubble forming periphery located at a low point in the body of pulp, with means for peeling off the bubbles and guiding them upward through the pulp substantially as fast as they are formed.

A still further object is to prevent the formation of pockets or dead areas in the separating zone surrounding the impeller.

In practice, the machine of my earlier application aforesaid, has proved itself extremely efficient in the production of a finely bubbled froth in connection with the flotation of metallurgical pulp. I have found however, that the aerating capacity of the impeller in that machine is unduly limited, because masses of bubbles, after once leaving the impeller, do not move away fast enough and so unnecessarily retard the following trains of bubbles coming from the impeller.

In the present invention, I provide a series of peeling blades disposed in angularly spaced planes around the impeller.

The adjacent edges of the peeling blades or peelers, are spaced apart from the periphery of the impeller, so as to prevent mechanical interference. The peelers deflect the bubbles away from the impeller substantially as fast as they are formed, and provide surfaces along which the bubbles quickly rise.

Figure 1:
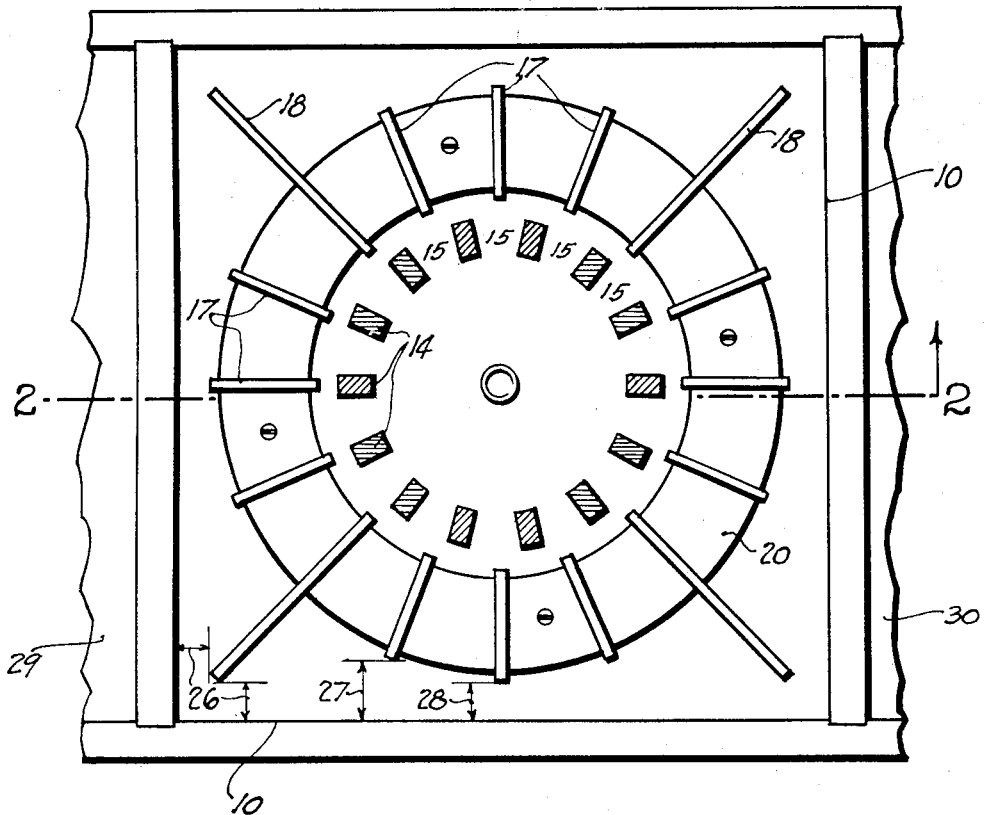
Figure 2:
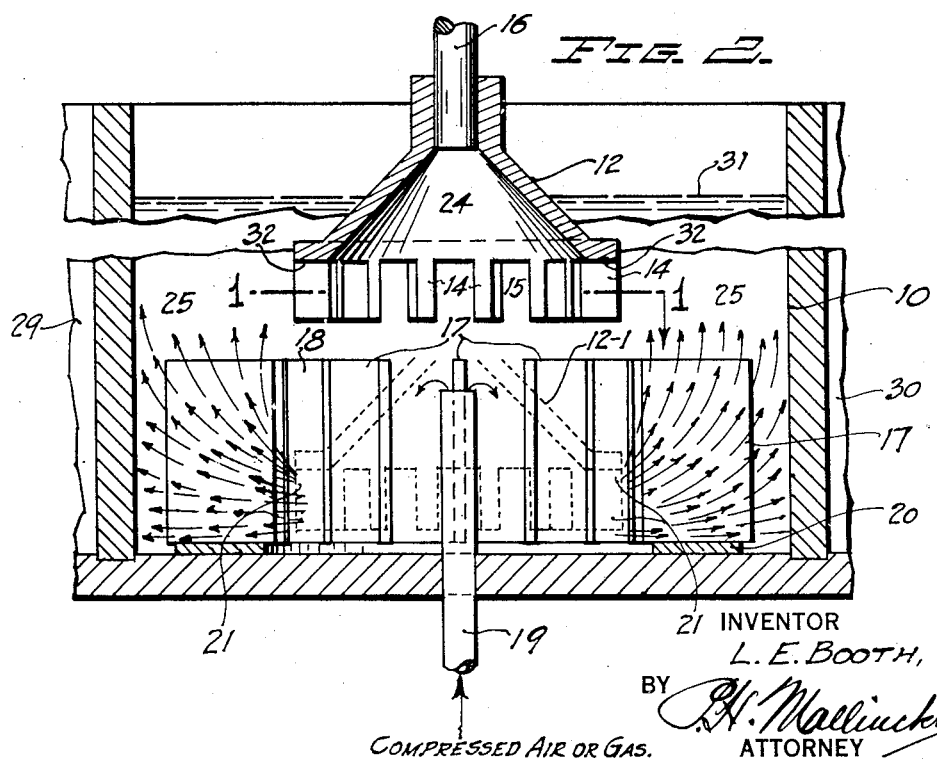

In the accompanying drawing, which illustrates one desirable embodiment of the invention:

Fig. 1 represents a plan, partly in horizontal section through the impeller, taken along the line 1—1 in Fig. 2; and, Fig. 2, a vertical section taken on the line 2—2 in Fig. 1.

Referring to the drawing, the numeral 10 indicates a housing or cell adapted to contain flotation pulp, and within which is operatively disposed an aerating impeller 12. The impeller may be in the form of a bell or hollow cone having an airtight wall with a denture composed of depending lugs 14 spaced apart from one another, along the basal periphery of the impeller. This denture defines circumferential openings 15 between consecutive lugs. The impeller is rigidly mounted on a vertical shaft 16, which in turn may be mounted for rotation, much after the manner shown in my earlier application aforesaid. It is deemed unnecessary to illustrate the shaft mounting in the present instance.

In Fig. 2, the impeller is shown in an abnormally elevated position, relative to the bottom of the cell, in order not to obscure a clear vision of the peeling blades 17 and 18. The normal operating position of the impeller is indicated by the dotted lines 12—1. The peeling blades are spaced apart from one another angularly along a circle, and preferably lie in planes extending radially from the impeller axis. The inner vertical edges of the peeling blades are spaced apart from the outer faces of the impeller lugs 14 sufficiently far, in order to provide ample clearance between them.

The arrows 21 in Fig. 2 indicate the low point of aeration in the cell from which the masses or trains of bubbles are guided outwardly and upwardly by the peeling blades.

In the present invention, as in my earlier one, it is necessary that compressed air or other gas coming from a suitable source of supply, be conducted into the space 24 defined by the airtight walls of the impeller. Such compressed air may be conveniently delivered through the pipe 19 in substantially the same manner and for the purpose described in my aforementioned U. S. Patent 2,055,065.

The peeling blades or peelers 17 and 18 extend upwardly a suitable distance from the bottom of the cell as may be required for properly guiding the trains of bubbles to and through the sorting or separating chamber 25 defined in the upper part of the cell. The height of the peelers indicated in Fig. 2, relative to the height of the impeller lugs, may be taken as an example of what I mean as a suitable distance.

The peeling blades may be supported in any suitable manner, one way being to provide an annular base or ring 20 which may either be made in a single piece or be composed of separate sectors (not shown). The blades may be substantially integral with the base and the assembly be made of cast metal, such as iron, or the assembly may be made of sheet metal, such as steel, where the blades and base may be united by welding. If desired, the blades may be covered with rubber (not shown) in any well known manner.

It is to be particularly noted that the peeling blades do not extend outwardly close up to the confining walls of the cell 10, but that certain open spaces or relief ports, such as 26, 27 and 28, are left between the outer edges of the blades and the confining walls. This is done so as to prevent the formation of dead pockets or areas in the angular spaces between consecutive peeling blades.

If the relief ports are not provided, certain tangential currents of pulp discharged by the impeller, due to the contact of the outer faces of the lugs 14 with the surrounding pulp, are projected into the angular spaces between the blades, thereby forming reactionary eddy currents which tend to push back the masses of bubbles projected outwardly from the impeller, and circumvent the very purpose of the peeling blades. The openings 26, 27 and 28 provide the necessary relief to prevent the formation of such objectionable dead pockets or areas in the pulp body.

The present machine is well adapted for operation in series where fractional concentration by flotation is desirable, and in any case, offers economy in floor space where batteries of machines are used. In such cases, other cells partially indicated at 29 and 30, can be constructed immediately adjacent.

In operation, the shaft 16 is rotated at a suitable speed, for example, so as to equal a peripheral speed of 1700 feet per minute, while at the same time compressed air is admitted through the pipe 19. Supposing the rotating impeller to be submerged in metallurgical pulp, the result is that great masses of fluid tend to be projected radially through the spaces 15, which as they tend to emerge at the common circumference of the lugs 14, are divided into great quantities of very fine bubbles, as fully described in my U. S. Patent 2,055,065.

At the moment that the massed bubbles emerge from the impeller, the peeling blades come into action to literally peel the bubbled masses from the impeller circumference, and to provide vertically extending surfaces along which the bubbles may easily climb without interference, and so be conducted to the tops of the blades from where they quickly rise to the pulp surface which may, for example, be located at 31.

The peeling blades being substantially plane, makes it possible for the impeller to be rotated in either clockwise or counterclockwise direction with the same result, so that one set of blades is sufficient, where otherwise it would be necessary to supply so-called right and left blades.

*Summarizing*

The peculiarly efficient aerating action of this invention is secured by the circular denture formed by the lugs or teeth 14 projecting from the discharge lip 32 which extends circumferentially of, and directly below, the airtight wall of the impeller structure. The lugs or teeth 14, being properly spaced apart from one another, act as clippers, and become operative to divide the streams of air or gas, tending to issue through the spaces 15 due to the pressure under which the air or gas issues from the pipe 19, into innumerable separate particles. The lugs or teeth, in order to exercise this clipping action, preferably have substantial depth transverse to the basal circumference of the impeller, as clearly indicated in the drawing. It is desirable that the cell be sufficiently extensive outside the basal circumference of the impeller so that substantially the maximum aerating and agitating effect of the fluid discharged by the impeller, is absorbed by the surrounding body of pulp.

The term "fluid" has hereinbefore been used to describe the matter issuing from the impeller, and it is to be noted that this matter is not necessarily only air or a gas, but that, it may be accompanied by a spray of liquid, such as flotation pulp, because a certain amount of the liquid always finds its way to the inside of the impeller, and as a consequence, accompanies the air or gas bubbles that issue from the impeller, in the form of a fine spray.

Having fully described my invention, what I claim is:

1. An aerating machine, including in combination, a cell adapted to contain liquid, a rotatable aerating impeller bell submerged at a low point in the said liquid, a circular denture operatively disposed at the basal circumference of the impeller bell so as to generate gas bubbles, and peeling blades disposed to guide the said gas bubbles away from the said basal circumference.

2. An aerating machine, including in combination, a submerged impeller bell rotatably disposed, said bell having an airtight wall structure with a discharge lip extending circumferentially of and directly below the wall structure, agitating means on said bell in operative proximity to the discharge lip, a pipe conducting air into the chamber defined by the impeller wall, and a plurality of peeler blades spaced apart from one another circumferentially around and in radial proximity to the impeller, said blades being operative to conduct bubbled masses away from the impeller.

3. An aerating machine, including in combination, a rotatable bell impeller disposed to discharge gas wholly along its basal circumference, a plurality of outstanding lugs spaced apart from one another around the basal circumference, a structure adapted to contain liquid in which said bell is submerged, means for rotating the submerged bell impeller, a conductor for gas under pressure leading into the impeller, and a plurality of peeling blades disposed in substantially vertical planes extending radially from the impeller axis and spaced apart from one another along the impeller circumference.

4. An aerating machine, including in combination, a rotatable bell comprising a substantially airtight superstructure open circumferentially at the base thereof, a structure, for containing liquid in which said bell is submerged, means for rotating the submerged bell, a pipe disposed to conduct air under pressure into said bell, said bell having clipping means along its base operative to divide streams of pressure air into innumerable separate particles, said clipping means comprising teeth spaced apart from one another circumferentially, said teeth having substantial depth along surfaces transverse to the circumference of the base of said bell, and peeling blades disposed to conduct the bubbles resulting from the divided streams of pressure air, away from the rotatable bell.

5. An aerating machine, including in combination, a rotatable bell having depending lugs spaced around the rim thereof, said lugs having faces of substantial depth transverse to the circumference of said rim, a structure for containing liquid in which said bell is submerged to a substantial depth, means for rotating the submerged bell, a pipe disposed to conduct gas under pressure into said bell, and peeling blades radially disposed just outside the lugs for the purpose of conducting away, air bubbles issuing through the spaces between said lugs.

6. An aerating machine, including in combination, an impeller bell having a substantially vertical axis of rotation, depending lugs spaced around the basal rim thereof, said lugs having faces of substantial depth transverse to the circumference of said rim, a structure adapted to contain liquid in which said bell is submerged, means for rotating the submerged bell, means for conducting air under pressure into said bell, and a plurality of substantially vertical peeling blades spaced radially in proximity to the depending lugs of the impeller basal rim.

7. An aerating machine, including in combination, an impeller bell rotatably mounted about a substantially vertical axis, said bell having outstanding lugs spaced apart from one another around the rim of the bell, a structure adapted to contain liquid in which said bell is submerged, means for rotating the submerged bell, means for conducting air under pressure into said bell and a plurality of substantially plane peeling blades spaced radially and operatively around the impeller bell, the body of liquid being sufficiently extensive around the basal rim of the bell so that substantially the maximum aerating and agitating effect of air and liquid discharged by the bell, shall be absorbed by said body of liquid.

LIONEL E. BOOTH.